United States Patent
Morgan

(10) Patent No.: US 9,084,956 B2
(45) Date of Patent: Jul. 21, 2015

(54) DUST COLLECTOR WITH MONITOR AIR FILTER

(71) Applicant: Lee Pendleton Morgan, Jonesboro, AR (US)

(72) Inventor: Lee Pendleton Morgan, Jonesboro, AR (US)

(73) Assignee: CAMFIL USA, INC., Riverdale, NJ (US)

( * ) Notice: Subject to any disclaimer, the term of this patent is extended or adjusted under 35 U.S.C. 154(b) by 74 days.

(21) Appl. No.: 13/846,825

(22) Filed: Mar. 18, 2013

(65) Prior Publication Data

US 2014/0260984 A1    Sep. 18, 2014

(51) Int. Cl.
 *B01D 49/00* (2006.01)
 *B01D 46/00* (2006.01)

(52) U.S. Cl.
 CPC ........ *B01D 46/0084* (2013.01); *B01D 46/0023* (2013.01)

(58) Field of Classification Search
 CPC .................. B01D 46/0084; B01D 46/0023
 USPC ............. 55/341.1–341.7, 361–382, 478–481; 96/421, 426–428; 95/273–287
 See application file for complete search history.

(56) References Cited

U.S. PATENT DOCUMENTS

| | | | | |
|---|---|---|---|---|
| 4,608,062 A | * | 8/1986 | Hughes | 96/190 |
| RE34,055 E | * | 9/1992 | Tassicker | 55/302 |
| 5,837,017 A | * | 11/1998 | Santschi et al. | 55/302 |
| 6,923,851 B1 | * | 8/2005 | Butler et al. | 96/135 |
| 2002/0073849 A1 | * | 6/2002 | Buettner et al. | 95/280 |
| 2003/0200733 A1 | * | 10/2003 | Jung | 55/302 |
| 2004/0020365 A1 | * | 2/2004 | Hansen et al. | 95/280 |
| 2008/0015797 A1 | * | 1/2008 | Kates | 702/47 |
| 2009/0308244 A1 | * | 12/2009 | Brichese et al. | 95/20 |
| 2011/0016838 A1 | * | 1/2011 | Smithies et al. | 55/521 |
| 2011/0220560 A1 | * | 9/2011 | Verdegan et al. | 210/90 |
| 2014/0208942 A1 | * | 7/2014 | Scipio et al. | 95/1 |
| 2014/0251143 A1 | * | 9/2014 | Hawkinson et al. | 95/287 |

FOREIGN PATENT DOCUMENTS

WO    WO2012/038317 A1 *    3/2012    ............ B01D 46/00

OTHER PUBLICATIONS

FARR APC, Gold Series® Brochure Air Pollution Control, 8 pages, 3505 S. Airport Road, Jonesboro, AR 72401.
Donaldson Torit, Torit Powercore Dust Collectors VH Series, PowerCore, 12 pages, Donaldson Company, Inc., P.O. Box 1299, Minneapolis, MN 55440, 2012.

* cited by examiner

*Primary Examiner* — Thomas McKenzie
(74) *Attorney, Agent, or Firm* — Patterson + Sheridan, LLP

(57) ABSTRACT

A dust collector having a monitor air filter and method for filtering are provided. In one embodiment, a dust collector includes a housing having an inlet, an outlet, a main air filter access port sealable by a main air filter door, and a monitor air filter access port sealable by a monitor air filter door. A first tube sheet and a second tube sheet are disposed in the housing. The first tube sheet separates a dirty air plenum from a clean air plenum, and has at least one first filter aperture. The second tube sheet separates the clean air plenum from an exhaust air plenum, and has at least one second filter aperture.

11 Claims, 2 Drawing Sheets

DUST COLLECTOR WITH MONITOR AIR FILTER

BACKGROUND

1. Field

The present invention relates to a dust collector with a monitor air filter.

2. Description of the Related Art

Almost every piece of process equipment in a powder and bulk solid handling plant depends on a dust collector to safely control dust or to reclaim valuable product. A dust collector generally includes a dirty air plenum separated from a clean air plenum by a plurality of main air filters. A fan is coupled to the clean air plenum to pull particulate-laden air from the dirty air plenum through the air filters and into the clean air plenum, from which the filtered air exits the dust collector through the fan. Any particulate bypassing the main air filters or passing through a leak in one of the main air filters often collects on the fan blades, causing increased energy consumption. Moreover, particulate collecting on the fan components, such as the bearings, diminishes the service life of the fan and adds to maintenance costs downtime.

Many dust collector systems are configured to recirculate the air exiting the dusts collector back into the plant environment to reduce heating and air conditioning costs. However, unfiltered particles escaping the dust collector are reintroduced into the plant environment and pose a health risk to plant personnel. For example, metal working facilities often have sparks and other debris that are pulled into the dust collector during the operation. Sparks and debris may damage the main air filter and thus compromise the filtration system by allowing dirty air to be recirculated back into the plant environment. To mitigate this risk, plant owners often place a final set of air filters downstream of the fan in order to capture any particulates escaping the dust collector prior to being reintroduced into the plant environment. However, as the duct work between the fan and the final filter is typically at an elevated pressure relative to the plant environment, any leakage in the duct work would carry the particulate back into the plant environment prior to passing through the final filter.

Thus, there is a need for an improved dust collector.

SUMMARY

A dust collector having a monitor air filter and method for filtering are provided. In one embodiment, a dust collector having a monitor air filter and method for filtering are provided. In one embodiment, a dust collector includes a housing having an inlet, an outlet, a main air filter access port sealable by a main air filter door, and a monitor air filter access port sealable by a monitor air filter door. A first tube sheet and a second tube sheet are disposed in the housing. The first tube sheet separates a dirty air plenum from a clean air plenum, and has at least one first filter aperture. The second tube sheet separates the clean air plenum from an exhaust air plenum, and has at least one second filter aperture.

In another embodiment, a dust collector having an improvement is provided. The dust collector has a housing having an air inlet, an air outlet, and a main air filter access port sealable by a main air filter access port door. The housing is configured to retain a plurality of replaceable main air filters through which air entering the housing through the inlet must pass prior to exiting the outlet of the housing. The improvement to the dust collector includes a mounting mechanism disposed in the housing and adapted to retain one or more monitor air filters in a position such that air passing through the replaceable main air filters must pass through the one or more monitor air filters prior to exiting the outlet. Pressure ports are formed in the housing in a location that enables pressure drop across the monitor air filters to be obtained.

In yet another embodiment, a method for filtering air is provided that includes flowing air into a housing and through a main air filter, the housing having a collection hopper positioned below the main air filter from which particulate separated from the air by the main air filter may be removed, flowing air exiting the main air filter through a monitor air filter, and monitoring the monitor air filter for a change in pressure drop indicative of a leak in the main air filter.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
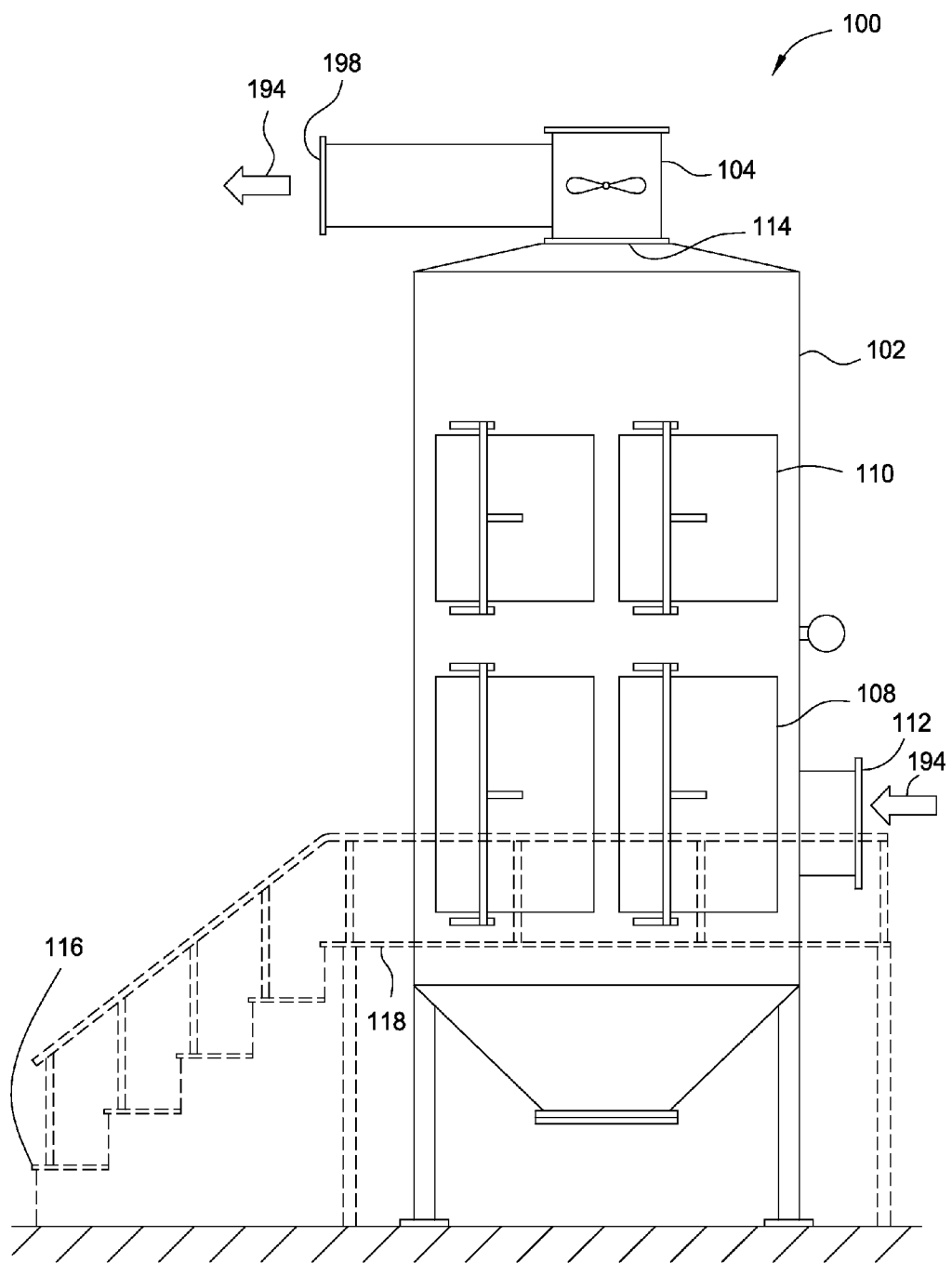
FIG. 1 is a plan view of one embodiment a dust collector having a main air filter and a monitor air filter disposed therein.
Figure 2:
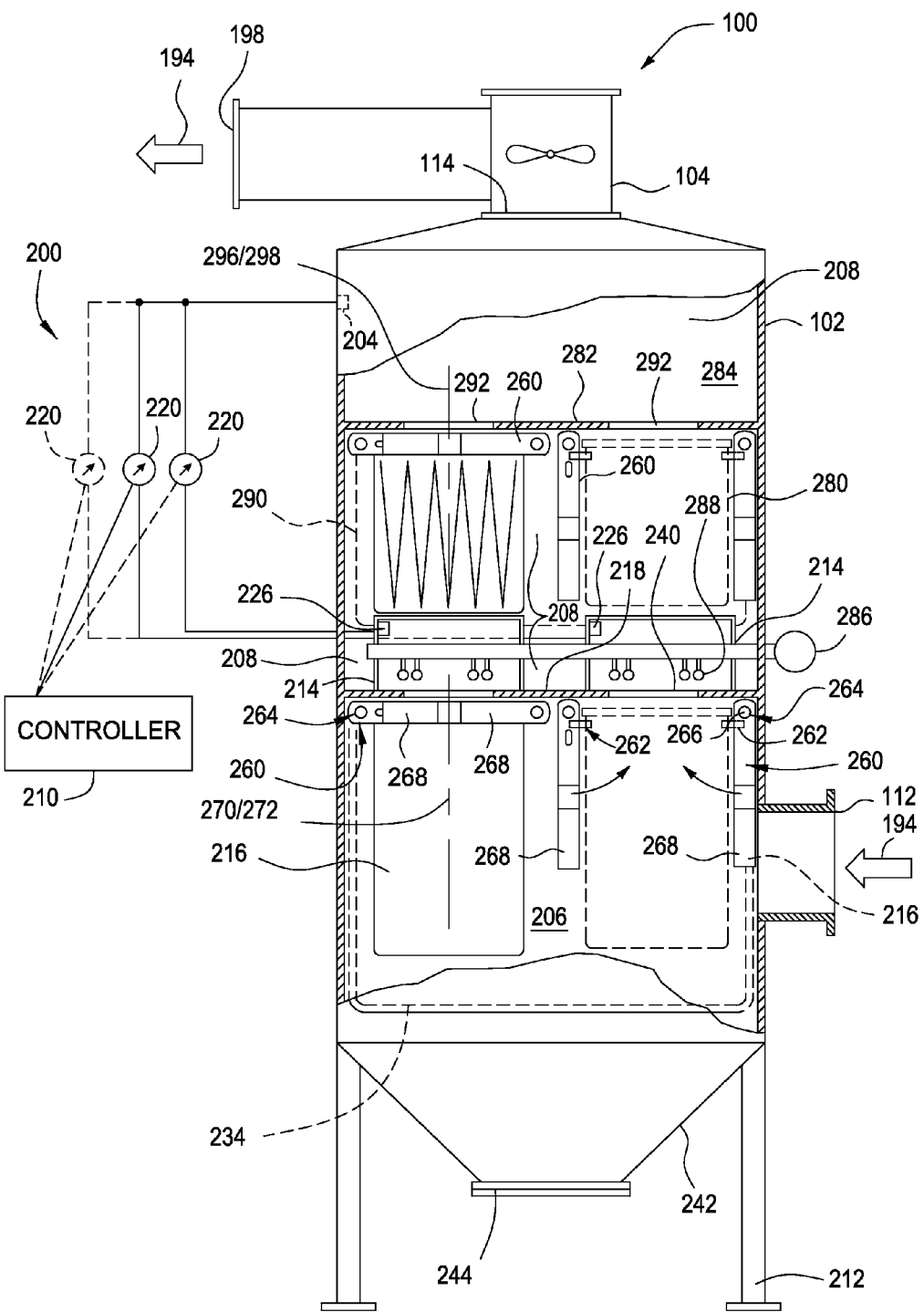
FIG. 2 is a partial cut away elevation of the dust collector of FIG. 1.

FIG. 1 is a plan view of a dust collector 100 and FIG. 2 is a partial cut away elevation of the dust collector of FIG. 1. Referring to FIG. 1 and FIG. 2, the dust collector 100 includes a housing 102 and optional air mover 104. The housing 102 of the dust collector 100 holds at least one replaceable main air filter 216 and at least one replaceable monitor air filter 280. Although the housing 102 holding the main air filter 216 and the monitor air filter 280 illustrated in the exemplary configuration of the dust collector 100 shown in FIGS. 1-2, it is contemplated that other configurations of dust collectors may be adapted to benefit from the embodiments described herein, including dust collectors of varying designs available from different manufactures.

The housing 102 is constructed from a rigid material suitable to withstand the operational pressures and loading for which the particular dust collector is designed. The housing 102 is supported by legs 212 and includes at least a main air filter access port 234 (shown in phantom in FIG. 2), a main air filter access door 108 (shown in a closed position in FIG. 1), a monitor air filter access port 290 (shown in phantom in FIG. 2), a monitor air filter access door 110 (shown in a closed position in FIG. 1), a platform 118 (shown in phantom in FIG. 1), a main air filter tube sheet 218, a monitor air filter tube sheet 282, an inlet 112, an outlet 114, a collection hopper 242, and a mounting mechanism 260.

The main air filter access port 234 is sealable by the air filter access door 108 and the monitor air filter access port 290 is sealable by the monitor air filter access door 110. The main air filter access port 234 is sized to allow passage of the main air filter 216, and the monitor air filter access port 290 is sized to allow passage of the monitor air filter 280. The monitor air filter access port 290 is located vertically above and upstream of the main air filter access port 234 and thereby reduces the floor space of the dust collector 100. Furthermore, steps 116 (shown in phantom in FIG. 1) lead to the common platform 118 to allow for easy access to both the filter ports 234, 290 and associated doors 108, 110. The main air filter access door 108 and the monitor air filter access door 110 may be opened to respectively replace and service the main air filter 216 and the monitor air filter 280 disposed in the housing 102. The main air filter access door 108 and the monitor air filter access door 110 may be closed to sealingly isolate the interior of the housing 102 from the surrounding environment.

A dirty air plenum 206 and a clean air plenum 208 are defined in the housing 102 and separated by the main air filter tube sheet 218. The inlet 112 formed through the housing 102 opens to the dirty air plenum 206. A plurality of main air filter apertures 240 are formed through the main air filter tube sheet 218 to allow air to flow from the dirty air plenum 206 to the clean air plenum 208. The main air filter 216 is mounted to the main air filter tube sheet 218 such that air flowing from the dirty air plenum 206 to the clean air plenum 208 must pass through the main air filter 216.

The main air filter 216 is sealingly mounted to the main air filter tube sheet 218 such that air passing through a main air filter aperture 240 formed through the main air filter tube sheet 218 from the dirty air plenum 206 to the clean air plenum 208 must first pass through the main air filter 216. The main air filter aperture 240 may have any suitable geometry, and in one embodiment is rectangular to allow greater tolerance for misalignment between a centerline 270 of the main air filter 216 and a centerline 272 of the main air filter aperture 240. The centerline 270 of the main air filter 216 and the centerline 272 of the main air filter aperture 240 are shown in co-linear alignment in FIG. 2. The greater tolerance for misalignment between the main air filter 216 and the main air filter aperture 240 advantageously minimizes the probability of the main air filter 216 blocking a portion of the main air filter aperture 240 which would result in higher operational pressure and undesirable increase in energy consumption.

The main air filters 216 may be a canister filter, bag filter or other suitable filter. The main air filters 216 may be configured to have a filtering efficiency in the range of about 99.99 to about 99.999 at 0.5 micron and larger particles by weight, or other suitable efficiency. Exemplary filters suitable for use as the main filter 216 are available from Camfil Farr Air Pollution Control (APC), Jonesboro, Ark., among other manufactures. In one embodiment, the main air filter 216 may be configured as a tubular filter element formed from pleated filter media selected to provide the pressure drop and efficiency desired for the designed operating parameters of the dust collector 100. The filter media may be woven or nonwoven filtration material, including wet-laid, meltblown, airlaid, needled, and composite filter media, among others. Filter media suitable for fabricating the tubular filter element of the main air filter 216 is well known and widely available, for example, from suppliers such as Hollingsworth & Vose Company, Lydall, Inc., and the like.

The dust collector 100 may optionally include a filter cleaning system 286 which is operable to remove at least a portion of the dust cake formed on the main air filter 216 during operation. The filter cleaning system 286 may vibrate, shock and/or utilize air jets provided by directional nozzles 288 to knock at least a portion of the dust cake formed on the main air filter into a collection hopper 242 forming a lower portion of the housing 102. The collection hopper 242 includes a door 244 which may be periodically opened to remove collected dust or other filtered materials from the dust collector 100.

Each main air filter 216 is sealingly mounted to the main air filter tube sheet 218 by a mounting mechanism 260. Many different types of mounting mechanism 260 are commonly known in the art, any of which may be employed in the housing 102. In the exemplary embodiment depicted in FIG. 2, the mounting mechanism 260 includes a pair of bars 262 coupled by actuators 264 to one of the housing 102 or the main air filter tube sheet 218. The actuators 264 are operable to move the bars 262 selectively towards and away from the main air filter tube sheet 218. When the bars 262 are moved to a closed position towards the main air filter tube sheet 218, the main air filter 216 is sealingly pushed against the main air filter tube sheet 218. When the bars 262 are moved to an open position away from the main air filter tube sheet 218, the main air filter 216 is spaced from the main air filter tube sheet 218 thereby allowing removal of the main air filter 216 through the main air filter access door 108.

In the embodiment depicted in FIG. 2, the actuator 264 of the mounting mechanism 260 includes a cam member 266 and a lever 268. The lever 268 may be actuated, for example, by motor, cylinder, by hand or other suitable means, between a first portion which rotates the cam member 266 to an orientation that displaces the bar 262 towards the main air filter tube sheet 218 (i.e., the closed position) and a second portion which rotates the cam member 266 to an orientation that displaces the bar 262 away from the main air filter tube sheet 218 (i.e., the open position). In the illustration of the dust collector 100 depicted in FIG. 2, the mounting mechanism 260 on the left side of the housing 102 is shown in the closed position clamping the main air filter 216 against the main air filter tube sheet 218 while the mounting mechanism 260 on the right side of the housing 102 is shown in the open position spacing the bar 262 from the main air filter tube sheet 218 to facilitate loading a replacement main air filter 216 (shown in phantom on the right hand side).

An exhaust air plenum 284 is also defined in the housing 102. The exhaust air plenum 284 is in direct communication with the outlet 114 of the housing 102. The exhaust air plenum 284 and the dirty air plenum 206 are separated by the monitor air filter tube sheet 282. A plurality of monitor air filter apertures 292 are formed through the monitor air filter tube sheet 282 to allow air to flow from the clean air plenum 208 to the exhaust air plenum 284. The monitor air filter 280 is mounted to the main air filter tube sheet 218 such that air flowing from the clean air plenum 208 to the exhaust air plenum 284 must pass through the monitor air filter 280.

The monitor air filter 280 is sealingly mounted to the monitor air filter tube sheet 282 such that air passing through a monitor air filter aperture 292 formed through the monitor air filter tube sheet 282 from the clean air plenum 208 to the exhaust air plenum 284 must first pass through the at least one monitor air filter 280. A centerline 296 of the monitor air filter 280 and a centerline 298 of the monitor air filter aperture 292 may be aligned with the centerline 272 of the main air filter aperture 240. In FIG. 2, centerlines 270, 272, 296 and 298 are shown in co-linear alignment. The co-linear alignment advantageously allows the air flowing from the main air filter aperture 240 to be better directed towards passing through the monitor air filter 280 in the clean air plenum 208, thereby minimizing pressure drop and contributing to the performance and energy efficiency of the dust collector 100. In one embodiment, the monitor air filter tube sheet 282 is disposed in the housing 102 vertically above the main air filter tube sheet 218 to minimize the foot-print of the dust collector 100.

Each monitor air filter 280 may have an efficiency of at least about 99.97 percent of all mono-dispersed particles of 0.3 microns at 100 feet per minute face velocity. The monitor air filter 280 may be a high-efficiency particulate air (HEPA) filter, a hi-flow (HEPA) air filter, a v-bank (HEPA) air filter, or any other suitable high efficiency air filter. The monitor air filter 280 may also have an initial resistance of less than about 1.35 inches of water at 2000 cubic feet per minute. The monitor air filter 280 may be configured as a canister filter, deep-pleat filter, v-bank filter, bag filter or other suitable filter. In one embodiment, the monitor air filter 280 may be formed from pleated filter media selected to provide the pressure drop and efficiency desired for the designed operating parameters of the dust collector 100. The filter media may be woven or non-woven filtration material, including wet-laid, meltblown, air-laid, and composite filter media, among others. Filter media suitable for fabricating the tubular filter element of the monitor air filter 280 is well known and widely available, for example, from suppliers such as Hollingsworth & Vose Company, Lydall, Inc., and the like.

Each monitor air filter 280 is sealingly mounted to the monitor air filter tube sheet 282 using a mounting mechanism 260 similar or identical to how the main air filter 216 is mounted to the main air filter tube sheet 218 as described above. Alternatively, other types of mounting mechanisms may be employed in the housing 102 to sealing secure the monitor air filter 280 to the monitor air filter tube sheet 282 while facilitating ease of monitory filter replacement.

An optional collar 214 may be provided in the clean air plenum 208 to direct flow entering the clean air plenum 208 through a specific main air filter aperture 240 to pass through a predefined monitor air filter aperture 292. In one embodiment, the collar 214 encircles and isolates a region of the clean air plenum 208 defined between the aperture 240 and a bottom (i.e., inlet) of the monitor air filter 280. In this manner, each main air filter 216 is associated with a specific monitor air filter 280 so that the health (i.e., leak condition) of each individual main air filter 216 may be assessed, as further discussed below.

The air mover 104, such as a fan or blower, is coupled to outlet 114 of the housing 102. The air mover 104 may be mounted to or be remote from the housing 102. In the embodiment depicted in FIG. 2, the air mover 104 mounted and supported by the housing 102. As illustrated by arrows 194 in FIG. 2, the air mover 104 draws the air into the housing 102 through the inlet 112 into the dirty air plenum 206, from the dirty air plenum 206 through the main air filters 216 into the clean air plenum 208, from the clean air plenum 208 through the monitor air filter 280 into the exhaust air plenum 284, and out of the housing 102 through the outlet 114. Air exits the air mover 104 through an outlet 198 which couples to ductwork (not shown) that directs the filtered are outside the facility or to HVAC systems for recirculation within the facility.

The health of the dust collector 100 is monitored using a monitoring system 200. The monitoring system 200 allows for leaks in the main air filters 216 and/or by-pass of the main air filters 216 to be detected without taking samples of the air downstream of the filters 216 for conventional particle-based efficiency or pin-hole leak detection. The monitoring system 200 is configured monitor a differential pressure across the monitor air filters 280. Under normal operating conditions and if the main air filters 216 are working properly, the pressure drop across the monitor air filters 280 will remain relatively steady or increase very gradually over time because most of the particulates are captured by the main air filters 216. If the main air filters 216 leak and/or are by-passed, the high efficiency of the monitor air filter 280 readily captures substantially all of the particulates escaping the main air filters 216, which quickly increases the pressure drop of the monitor air filter 280. This rapid and sudden increase in the pressure drop of the monitor air filter 280 is indicative of a leak in the main air filter 216. The dust collector 100 may be serviced in response to the leak indication to replace the leaking main air filters 216 and/or address the filter by-pass to prevent particles from exiting the dust collector 100 and introduced into the environment or recirculated into the work place. Additionally, the position of the monitor air filter 280 upstream of the air mover 104 maintains a reduced pressure within the clean air and exhaust air plenums 208, 284 relative to the exterior of the housing 102, thereby greatly reducing the probability of particulate escaping the housing 102.

In one embodiment, the monitoring system 200 includes a sensor 220 suitable for determining the pressure drop across the monitor air filter 280 and an optional controller 210. The sensor 220 is communicatively coupled to a first pressure port 204 fluidly coupled to the exhaust air plenum 284 and at least one second pressure port 226 fluidly coupled to the clean air plenum 208. The sensor 220 may be a differential pressure sensor, pressure transducer or other suitable sensor, examples of which are available from Dywer Instruments. The sensor 220 may be configured to directly display the differential pressure across the monitor air filter 280 so that a technician may take appropriate action once the differential pressure exceeds a threshold level. Alternatively, the sensor 220 may be configured to provide a metric, for example, digital or analog signal, to the controller 210. The controller 210, in response to the metric being indicative of the differential pressure across the monitor air filter 280 exceeding a threshold level, generates an alert. The alert may be at least one or more of an audible, a visual signal or an electronic signal, such as a page, email, text message, or other signal. In this configuration, only a single sensor 220 is needed to determine if a leak to one of the main air filters 216 is present.

In another embodiment, a plurality of second pressure ports 226 are utilized in the clean air plenum 208, with a respective second pressure ports 226 being in communication with the region of the clean air plenum 208 circumscribed by a respective one of the collars 214 and bounded by an associated pair of monitor air filter 280 and main air filter 216. In this embodiment, each sensor 220 is coupled to a common first pressure port 204 and a unique second pressure port 226, thereby making the information obtained by a unique sensor 220 associated with a specific pair of monitor and main air filters 280, 216. Thus, an indication of pressure rise detected by a particular sensor 220 is indicative of leakage to a specific main air filter 216. Knowing which main air filter 216 is leaking prior to servicing the dust collector 100 significantly reduces the time required for servicing and eliminates potential replacement of a non-leaking main air filter.

Thus, utilization of a monitor air filter downstream of a main air filter advantageously allows for air to be exhausted from the dust collector without concern of contamination. This is particularly advantageous in HVAC systems that recirculate air, as the potential to introduce contaminants into the work environment is substantially reduced. Additionally, because the main air filter and monitor air filter are on the upstream side of the air mover, the air mover accumulates less particulates, thereby maintaining the performance and efficiency of the air mover, extending the life of the air mover while also extending the air mover service interval.

While the foregoing is directed to embodiments of the present disclosure, other and further embodiments of the disclosure may be devised without departing from the basic scope thereof, and the scope thereof is determined by the claims that follow.

What is claimed is:

1. A dust collector for holding at least one main filter, the dust collector comprising:
 a housing comprising:
  a collection hopper;
  an inlet,
  an outlet,
  a dirty air plenum air plenum open to the inlet,
  an exhaust plenum open to the outlet,
  a clean air plenum disposed between the dirty air plenum and the exhaust plenum,
  a main air filter access port sealable by a main air filter door, and
  a monitor air filter access port sealable by a monitor air filter door;
 a first tube sheet separating the dirty air plenum from the clean air plenum within the housing, the first tube sheet configured to support the main filter within the dirty air plenum in a position exposed to the collection hopper such that collected particulate falling from the main filter drops into the collection hopper, the first tube sheet having a plurality of first filter apertures, each first filter aperture having a centerline;
 second tube sheet separating the clean air plenum from the exhaust air plenum within the housing, the second tube sheet having a plurality of second filter apertures, each second filter aperture having a second centerline, each second filter aperture aligned with a corresponding one of the first filter apertures, each first filter aperture aligned with a corresponding one of the second filter apertures, the first and second centerlines of each corresponding pair of filter apertures being aligned; and
 a sensor operable to detect pressure differential across a monitor air filter in one of the plurality of second filter apertures, the pressure differential indicative of a leak in a main air filter installed in the corresponding one of the first filter apertures in the corresponding pair of filter apertures;
 wherein the second tube sheet is located vertically above the first tube sheet.

2. The dust collector of claim 1, further comprising:
 a first pressure port in communication with the exhaust plenum; and
 a second pressure port in communication with the dean air plenum.

3. The dust collector of claim 2, further comprising:
 a sensor coupled to the first pressure port and the second pressure port, the sensor adapted to provide a metric indicative of pressure drop through a filter mounted to the second tube sheet.

4. The dust collector of claim 1, further comprising:
 a first pressure port in communication with the exhaust plenum; and
 a plurality of second pressure ports in communication with the clean air plenum.

5. The dust collector of claim 4, further comprising:
 a plurality of sensors coupled to the first pressure port, each of the sensors coupled to a respective one of the second pressure ports, the sensors adapted to provide a metric indicative of pressure drop through filters mounted to the second tube sheet.

6. The dust collector of claim 1, further comprising:
 an air mover mounted to the housing.

7. The dust collector of claim 6, wherein the air mover is mounted to a top of the housing.

8. The dust collector of claim 1, further comprising:
 a first mounting mechanism adapted to retain the one or more main air filters to the first tube sheet; and
 a second mounting mechanism adapted to retain one or more monitor air filters to the second tube sheet.

9. The dust collector of claim 8, further comprising:
 a door formed at a bottom of the housing and operable to remove collected particulate from the collection hopper.

10. The dust collector of claim 1, further comprising:
 a high efficiency air filter engaged with the second tube sheet.

11. The dust collector of claim 1, further comprising:
 a plurality of tubular main air filters replaceably mounted to the first tube sheet; and
 a plurality of high efficiency monitor air filters replaceably mounted to the second tube sheet, a respective one of the main air filter vertically aligned with a respective one of the monitor air filters.

* * * * *